(12) United States Patent
Satake (10) Patent No.: US 7,180,639 B2
(45) Date of Patent: Feb. 20, 2007

(54) IMAGE COMMUNICATION APPARATUS

(75) Inventor: Makoto Satake, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 951 days.

(21) Appl. No.: 10/386,688

(22) Filed: Mar. 13, 2003

(65) Prior Publication Data

US 2003/0174361 A1  Sep. 18, 2003

(30) Foreign Application Priority Data

Mar. 18, 2002 (JP) ............................. 2002-073571

(51) Int. Cl.
*H04N 1/23* (2006.01)
(52) U.S. Cl. ................... 358/468; 379/376.02
(58) Field of Classification Search ................ 358/296; 379/376.02
See application file for complete search history.

(56) References Cited

U.S. PATENT DOCUMENTS 5,608,540 A * 3/1997 Ogawa ..................... 358/434
5,877,872 A * 3/1999 Nomura et al. ............. 358/468

FOREIGN PATENT DOCUMENTS

JP          2000-151096         5/2000
JP          2000151906 A   *    5/2000

* cited by examiner

*Primary Examiner*—Daniel Swerdlow
*Assistant Examiner*—Allen Nguyen
(74) *Attorney, Agent, or Firm*—Fitzpatrick, Cella, Harper & Scinto (57) ABSTRACT

An object of the present invention is to provide an image communication apparatus which can improve the noise-reducing effect when a ringing tone has been set to non-ringing or when an operation mode at a start time of recording is for recording at a fax receive time, and which can prevent a recording speed from lowering at a time when a ringing tone has been set to ringing, at a time of copying or at a similar time. There is provided an image communication apparatus which performs recording in a silent mode more silently than in a regular mode when a ringing tone has been set to non-ringing or when an operation mode at a start time of recording is for recording at a fax receive time, and performs recording in a regular mode at a time when a ringing tone has been set to ringing, at a time of copying or at a similar time.

5 Claims, 7 Drawing Sheets

IMAGE COMMUNICATION APPARATUS

BACKGROUND OF THE INVENTION

1. Field of the Invention

The present invention relates to an image communication apparatus such as a facsimile apparatus, which is provided with a recording unit which can perform recording more silently than regularly.

2. Related Background Art

Conventionally, an image communication apparatus such as a facsimile apparatus or the like is always connected to a telephone line or network to record received image data night and day.

Therefore, a conventional image communication apparatus such as a facsimile apparatus or the like has setting means for performing setting about whether a ringing tone at a receive time of a ringing signal is rung or not rung. The image communication apparatus is set to a state that a ringing tone is not rung by the setting means, so that, even when a ringing signal is received from another communication apparatus through a communication line, a ringing tone is not rung. Thus, the noise-reducing effect at midnight or at a similar situation can be achieved to some extent.

However, there is a problem that, even if a ringing tone is set to non-ringing and a ringing signal is received without ringing a ringing tone, noises due to a recording for received image data occur, which results in insufficient noise-reducing effect.

Further, in Japanese Patent Application Laid-Open No. 2000-151906, a facsimile apparatus provided with a recording unit having means for performing recording more silently than at a regular recording to suppress noises at a recording time has been proposed. In the invention described in the above publication, however, since setting of a silent-record mode and a ringing setting of a ringing tone are performed independently from each other, and operation or recording is conducted according to each setting, there occurs a problem that, even if the ringing tone is set to non-ringing, noises due to recording occur, which results in insufficient noise-reducing effect.

In case that recording is performed in a silent-record mode, recording can be performed in a noise-suppressing manner as compared with a regular record mode but such a problem that a recording speed is lowered occurs. For example, in case that copying or memory reception recording is performed, particularly, in case that data amount is much, there is a problem that, when recording is performed in a silent record mode, a process time becomes longer, which results in deterioration of a working efficiency of an operator.

SUMMARY OF THE INVENTION

An object of the present invention is to provide an image communication apparatus which can improve the noise-reducing effect when a ringing tone has been set to non-ringing or when an operation mode at a start time of recording has been set to a fax receive mode, and which can prevent a recording speed from lowering at a time when a ringing tone has been set to ringing, at a copying time or at a similar time.

DESCRIPTION OF THE PREFERRED EMBODIMENTS

Figure 7:
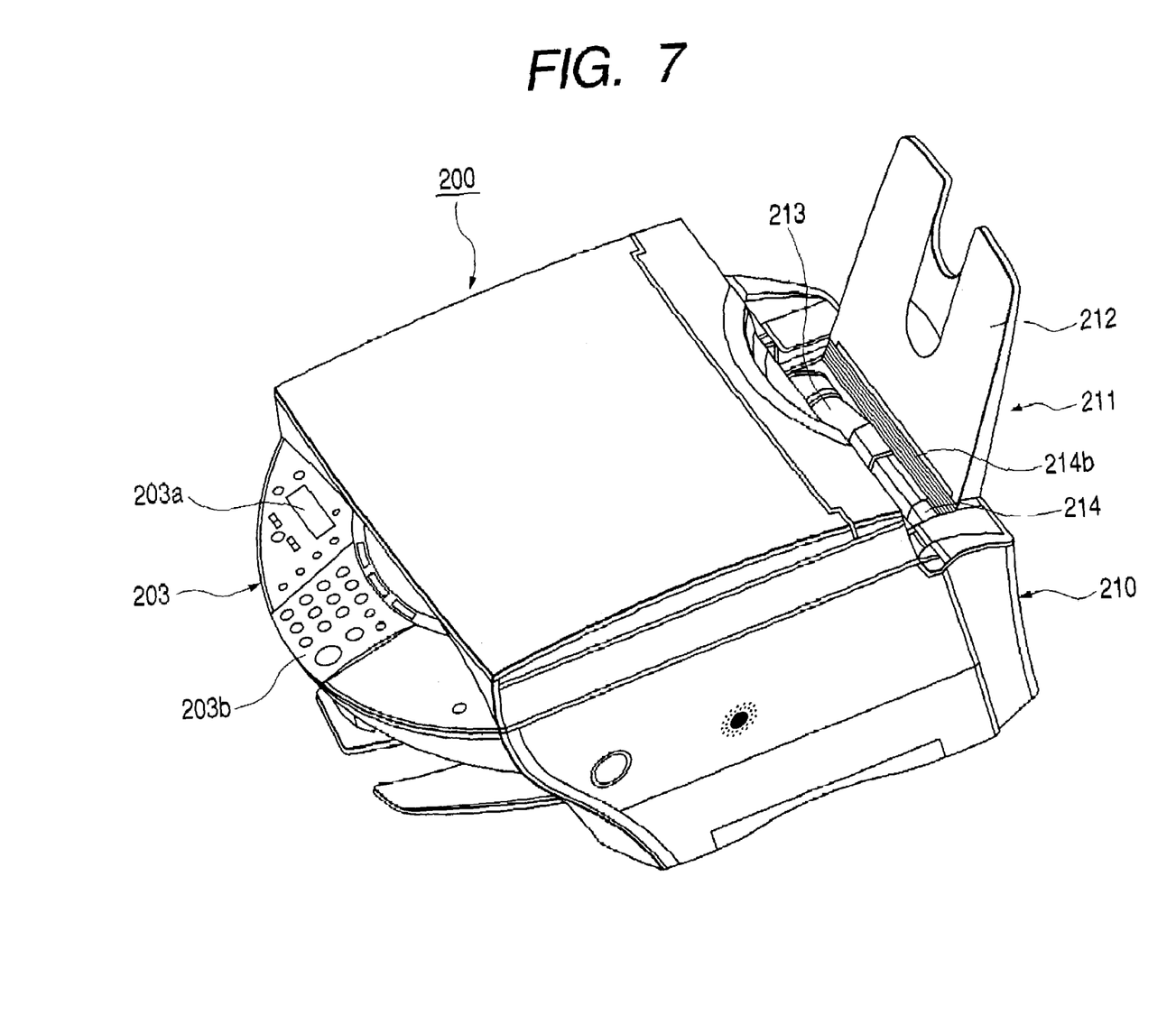
FIG. 7 is an appearance view of the facsimile apparatus FS1 according to the embodiment of the invention.
Figure 8:
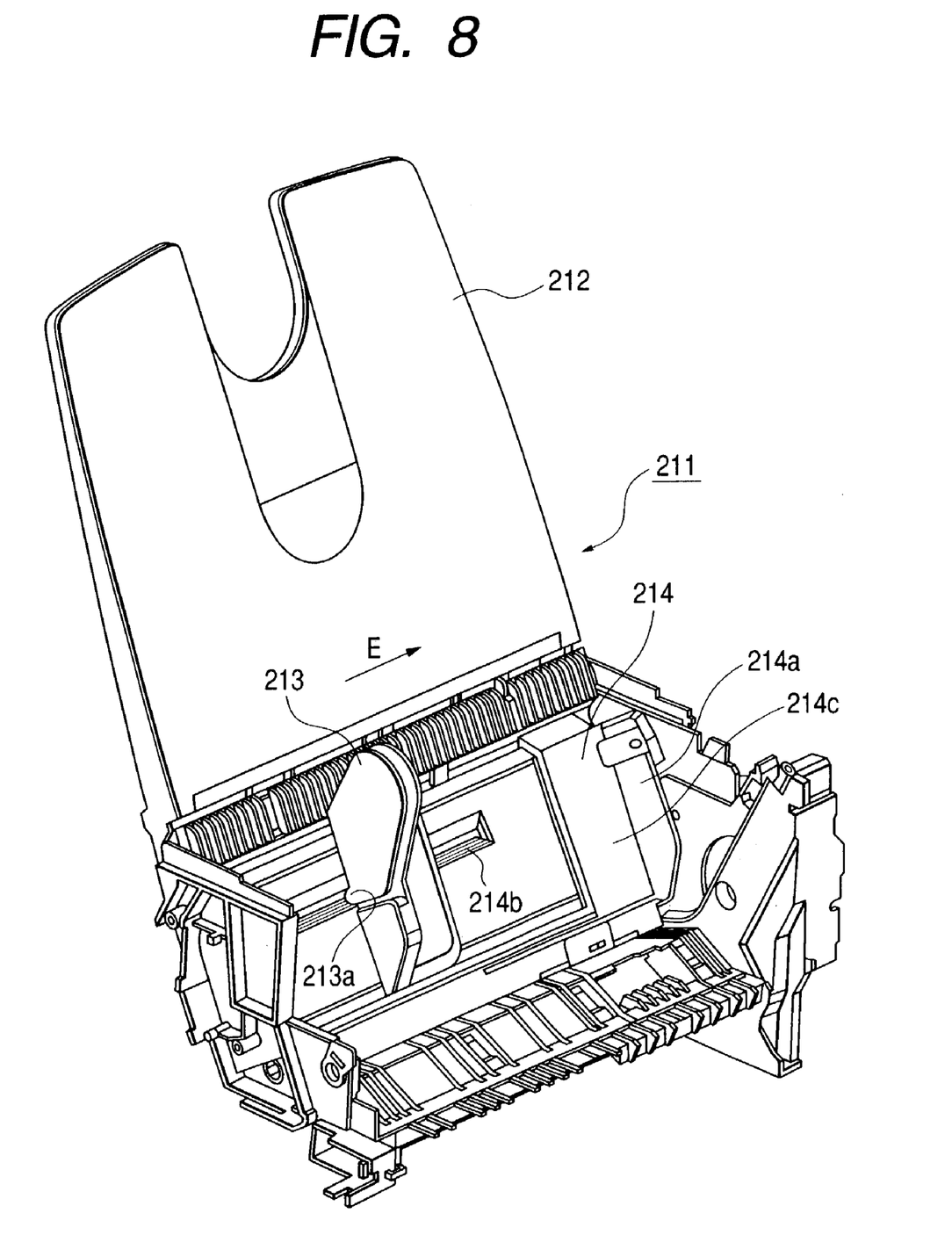
FIG. 8 is a perspective view showing a paper feeding unit of the facsimile apparatus FS1 according to the embodiment of the invention.

FIG. 7 is an appearance view of a facsimile apparatus FS1 according to an embodiment of the present invention. FIG. 8 is a perspective view showing a paper feeding unit of the facsimile apparatus FS1 according to the embodiment of the invention. In FIGS. 7 and 8, reference numeral 200 denotes an image reading and recording apparatus (an image recording apparatus), 203 denotes an operation panel, 203a denotes a display unit, 203b denotes various keys, 211 denotes an automatic paper feeding unit, 212 denotes an auxiliary tray, 213 denotes a slider (an alignment member movable so as to match with a width of a recording paper to be used), 213a denotes a pawl-shaped member (engagement portion, engagement piece), and 214 denotes a pressure plate which is a member on which a recording paper stack is to be loaded and which shakes and aligns the recording paper stack according to its movement. In the movement, flapping noises occur. The pressure plate 214 is hereinafter referred to as "an ASF middle plate. Reference numeral 214a denotes a side face, 214b denotes a latch portion (a portion to be engaged), and 214c denotes a recording sheet placement face (a placement face on which material to be used for recording is loaded).

Figure 1:
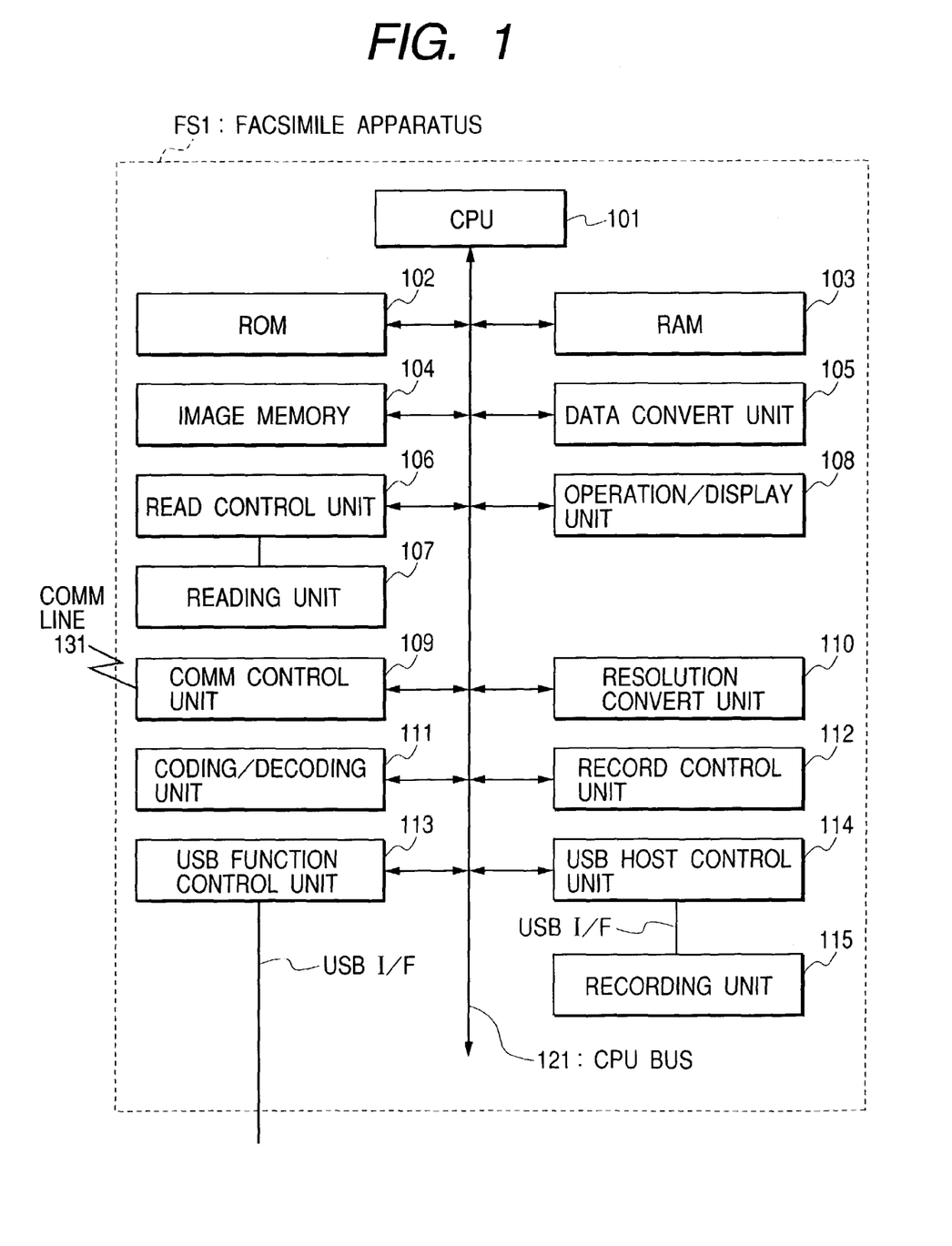
FIG. 1 is a block diagram showing a schematic configuration of a facsimile apparatus FS1 according to one embodiment of the present invention.

FIG. 1 is a block diagram showing a schematic configuration of the facsimile apparatus FS1 according to the embodiment of the present invention.

In the facsimile apparatus FS1, a CPU 101 is a system control unit, and it controls the entire of the facsimile apparatus FS1.

A ROM 102 stores control programs which the CPU 101 executes, an incorporated operating system (OS) program or the like. In the above embodiment, respective control programs stored in the ROM 102 perform software controls such as a scheduling, task switch and the like under control of the incorporated OS stored in the ROM 102.

A RAM 103 is configured with an SRAM (static RAM) and the like, and it stores program control variables or parameters and the like therein and also stores set values registered by an operator, management data for the facsimile apparatus FS1 and the like, and it is provided with a buffer region for various works.

An image memory 104 is configured with a DRAM (dynamic RAM) and the like, and stores image data therein.

A data convert unit 105 performs analysis of page description language (PDL) and the like, CG (computer graphics) expansion of character data and the like, and image data conversion.

A read control unit 106 performs various image processes such as binarization process or gradation process, on image signals which are obtained by optically reading an original by a CIS image sensor (contact image sensor) of a reading unit 107 to convert the read original to electric image data, via an image process control unit (not shown), so that highly precise or fine image data is outputted. Incidentally, in the above embodiment, the read control unit 106 can accommodate to both control systems, that is, a sheet read control system for reading an original while conveying the original and a book read control system for scanning an original on a platen.

An operation/display unit 108 includes an operation section provided with numeral input keys, character input keys, a one-touch telephone number key, a mode setting key, a decision key, a cancel key and the like, through which a user makes decision of destination data to be transmitted with an image or registration of set data, and a display section comprising various keys, an LED (light emitting diode), an LCD (liquid crystal display) and the like, for making displays about various inputting operations performed by an operator, operation conditions of the facsimile apparatus FS1, status conditions and the like.

A communication control unit 109 is configured by a MODEM (a modulator/demodulator), a NCU (a network control unit) or the like. In the above embodiment, the communication control unit 109 is connected to an analog communication line (PSTN: public switched telephone network) 131 to perform communication control according to T30 protocol and line control such as call-out or call-in to the communication line.

A resolution convert unit 110 performs resolution convert control such as a millimeter-inch resolution conversion of image data or the like. Incidentally, in the resolution convert unit 110, enlarging/reducing process of image data can be performed.

A coding/decoding unit 111 performs coding/decoding process and enlarging/reducing process on image data (MH, MR, MMR, JBIG, JPEG or the like) processed or handled by the facsimile apparatus FS1.

A record control unit 112 performs various processes such as smoothing process, record density correcting process, and color correcting process, on data of an image to be printed through an image process control unit (not shown) to thereby convert the data to highly precise or fine image data and output the same to a USB host control unit 114. Further, by controlling the USB host control unit 114, the record control unit 112 also serves so as to acquire condition information data of the recording unit 115 periodically.

A USB function control unit 113 is configured so as to perform communication control of a USB interface, and it performs a protocol control in accordance with USB communication standard so as to convert data from a USB control task which the CPU 101 executes to a packet and perform a USB packet transmission to an external information processing terminal, and so as to convert a USB packet from the external information processing terminal to data to transmit the same to the CPU 101.

A USB host control unit 114 is a control unit for performing communication according to a protocol defined in the USB communication standard. The USB communication standard is a standard for allowing bidirectional data communication at a high speed, and a plurality of hubs or functions (slaves) can be connected to one host (a master). The USB host control unit 114 has a host function in the USB communication.

A recording unit 115 is a printer comprising a laser beam printer, an ink jet printer or the like, and it prints color image data or monochromic image data on a printing member or printing medium. Further, the recording unit 115 has a silent mode. The silent mode means that a paper feeding speed by paper feeding rollers is decreased by reducing a driving speed of a motor for an ASF (auto sheet feeder) at a time of paper feeding, that noises generated at the time of paper feeding are reduced by lowering a speed for pressing down the ASF middle plate at the time of paper feeding, and further that noises generated during printing are reduced by lowering a driving speed of a paper feeding (LF) motor at a time of paper discharging during printing. In a flowchart explained later, causing the recording unit 115 to perform printing in the silent mode is called "silent-record process" and such a setting that the recording unit 115 performs printing in the silent mode, which is conducted by a user, is called "setting to a silent-record mode". The USB host control unit 114 performs communication according to a protocol defined by the USB communication standard, and particularly, the recording unit 115 has a recording function.

In this embodiment, the UBS communication of the recording function employs one to one connection configuration.

The above constituent elements 101 to 106 and 108 to 114 are mutually connected via a CPU bus 121 which the CPU 101 manages.

Next, recording of the facsimile apparatus FS1 according to the first embodiment of the invention will be explained.

Figure 2:
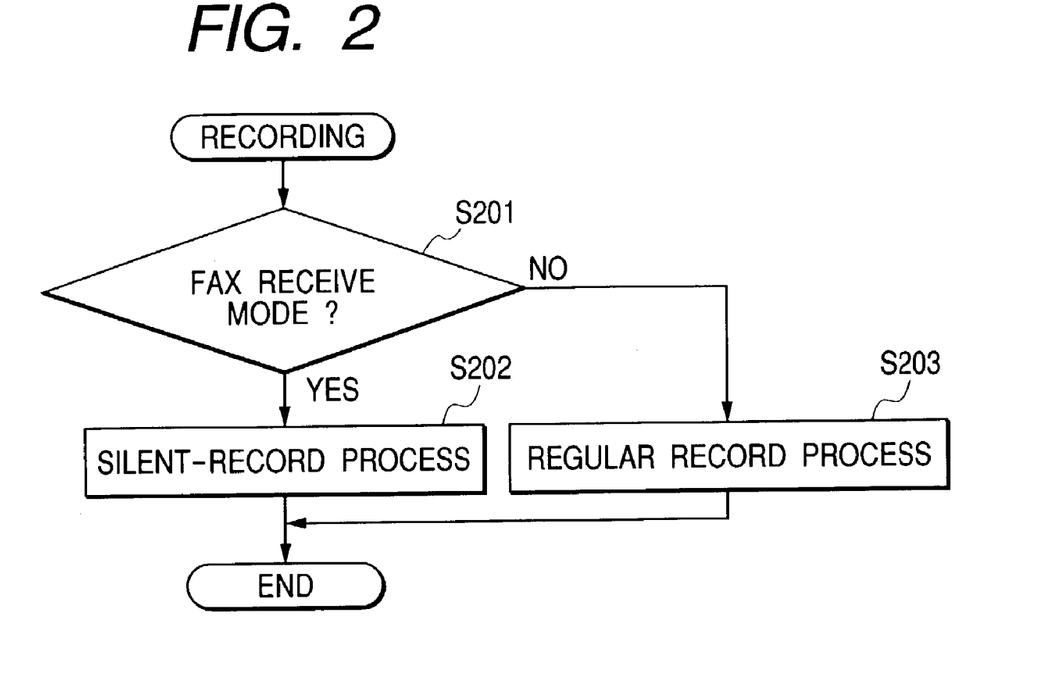
FIG. 2 is a flowchart showing operation of the facsimile apparatus FS1.

FIG. 2 is a flowchart showing operation of the facsimile apparatus FS1.

In the facsimile apparatus FS1, recording is performed at a time of fax receiving or at a time of copying. In the recording, it is first determined whether or not an operation mode is for recording at a time of fax receiving (S201). When the operation mode is for recording at the time of fax reception, a silent-record process is performed (S202), but in case of recording at the other time (at a time of copying, at a time of fax memory receiving and recording or at a similar time), a regular record process is performed (S203).

Thus, in the first embodiment of the invention, in case of recording at the time of fax receiving, recording is performed more silently than in case of regular record process, thereby improving the noise-reducing effect. At a time of recording except for the recording at the time of fax receiving, recording is performed regularly, thereby preventing a recording speed from lowering.

Next, recording of a facsimile apparatus FS2 according to a second embodiment of the invention will be explained.

The configuration of the facsimile apparatus FS2 is similar to that of the facsimile apparatus FS1.

Figure 3:
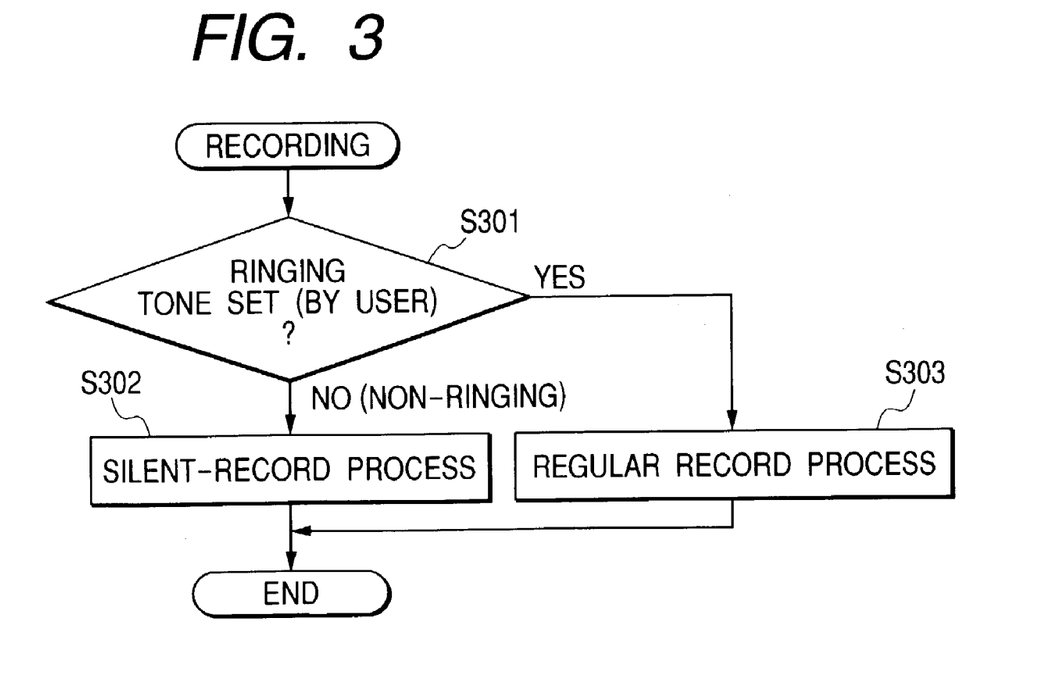
FIG. 3 is a flowchart showing recording in a facsimile apparatus FS2 according to a second embodiment of the invention.

FIG. 3 is a flowchart showing recording in the facsimile apparatus FS2 according to the second embodiment of the invention.

First, it is determined whether a ringing tone set stored in the RAM 103, which can be set by a user is in a ringing state or in a non-ringing state (S301). When the ringing tone set is in the ringing state, a regular record process is performed (S303). When the ringing tone set is in the non-ringing state, a silent-record process is performed (S302).

In the second embodiment of the invention, thus, in case that the ringing tone set is in the non-ringing state, recording is performed more silently than in case of recording in the regular record process, thereby improving the noise-reducing effect. On the other hand, in case that the ringing tone set is in ringing state, recording is performed regularly, thereby preventing a recording speed from lowering.

Next, recording of a facsimile apparatus FS3 according to a third embodiment of the invention will be explained.

The configuration of the facsimile apparatus FS3 is similar to that of the facsimile apparatus FS1.

Figure 4:
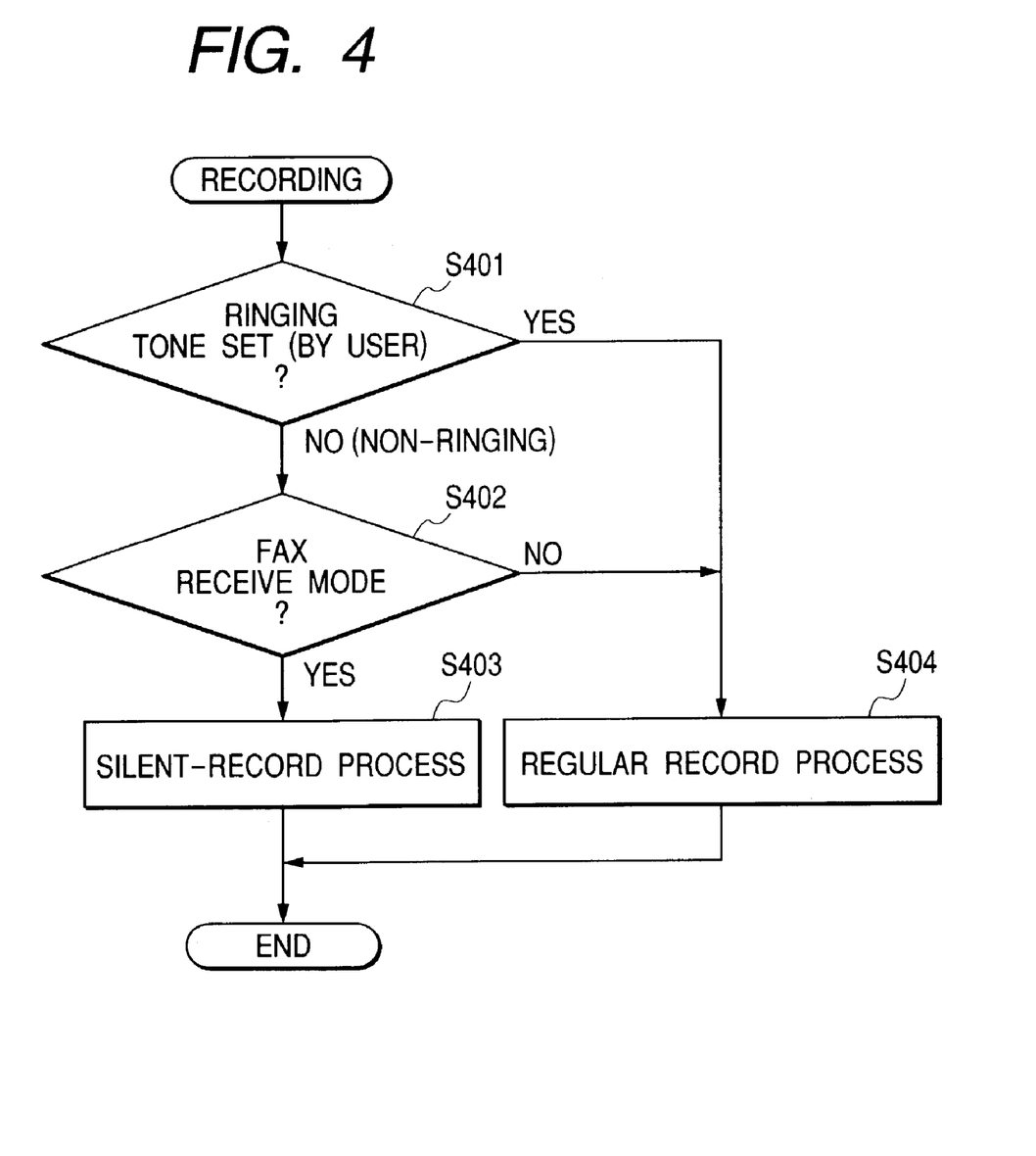
FIG. 4 is a flowchart showing operation of a facsimile apparatus FS3 according to a third embodiment of the invention.

FIG. 4 is a flowchart showing recording in the facsimile apparatus FS3 according to the third embodiment of the invention.

First, it is determined whether a ringing tone set (stored in the RAM 103) which can be set by a user is in a ringing state or in a non-ringing state (S401). When the ringing tone set is in the ringing state, a regular recording is performed (S404). When the ringing tone set is in the non-ringing state, whether or not the operation mode is for recording at a time of fax receiving is determined (S402). When the operation mode is for recording at a time of fax receiving, a silent-record process is performed (S403). When the operation mode is for recording at a time other than the time of fax receiving (at a time of copying, at a time of fax memory receiving and recording, and at a similar time), a regular record process is performed (S404).

As described above, in the third embodiment of the invention, in case that the ringing tone set is in the non-ringing state and recording at a time of fax receiving is performed, recording is performed more silently than that in the regular record process, thereby improving the noise-reducing effect. Recording at a recording time other that the time of fax receiving is performed regularly, thereby preventing a recording speed from lowering.

Next, recording of a facsimile apparatus FS4 according to a fourth embodiment of the invention will be explained.

The configuration of the facsimile apparatus FS4 is similar to that of the facsimile apparatus FS1.

Figure 5:
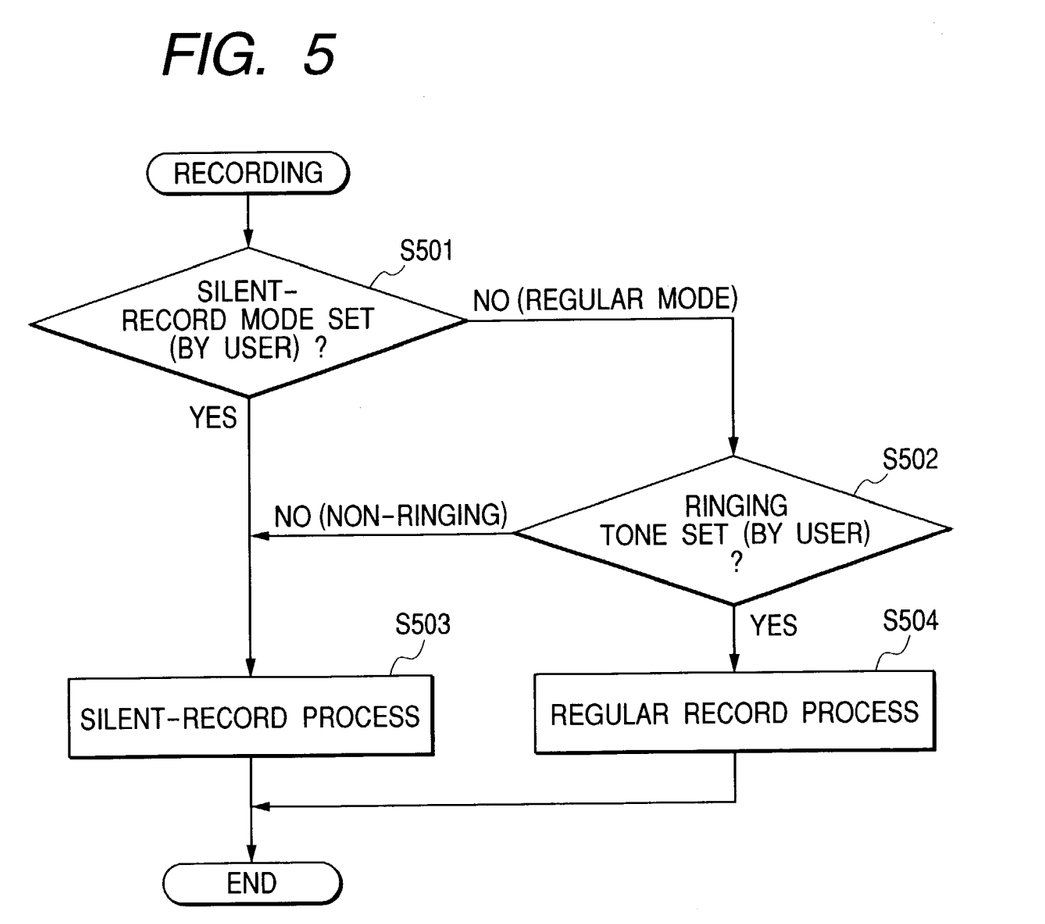
FIG. 5 is a flowchart showing operation of a facsimile apparatus FS4 according to a fourth embodiment of the invention.

FIG. 5 is a flowchart showing recording in the facsimile apparatus FS4 according to the fourth embodiment of the invention.

First, it is determined whether the record mode (stored in the RAM 103) which can be set by a user is a regular record mode or a silent-record mode (S501). When the record mode is the silent-record mode, a silent-record process is performed (S503). When the record mode is the regular record mode, it is determined whether the ringing tone set (stored in the RAM 103) which can be set by a user is in a ringing state or in a non-ringing state (S502). When the ringing tone set is in the non-ringing state, the silent-record process is performed (S503), while the regular record process is performed when the ringing tone set is in the ringing state (S504).

As described above, in the fourth embodiment of the invention, in case that the record mode has been set to the silent mode or in case that, even when the operation mode has been set to the regular mode, the ringing tone set is in the non-ringing state, recording is performed more silently than the case of the regular recording, thereby improving the noise-reducing effect. Recording at a time other than the time of fax receiving is performed regularly, thereby preventing a recording speed from lowering.

Next, recording of a facsimile apparatus FS5 according to a fifth embodiment of the invention will be explained.

The configuration of the facsimile apparatus FS5 is similar to that of the facsimile apparatus FS1.

Figure 6:
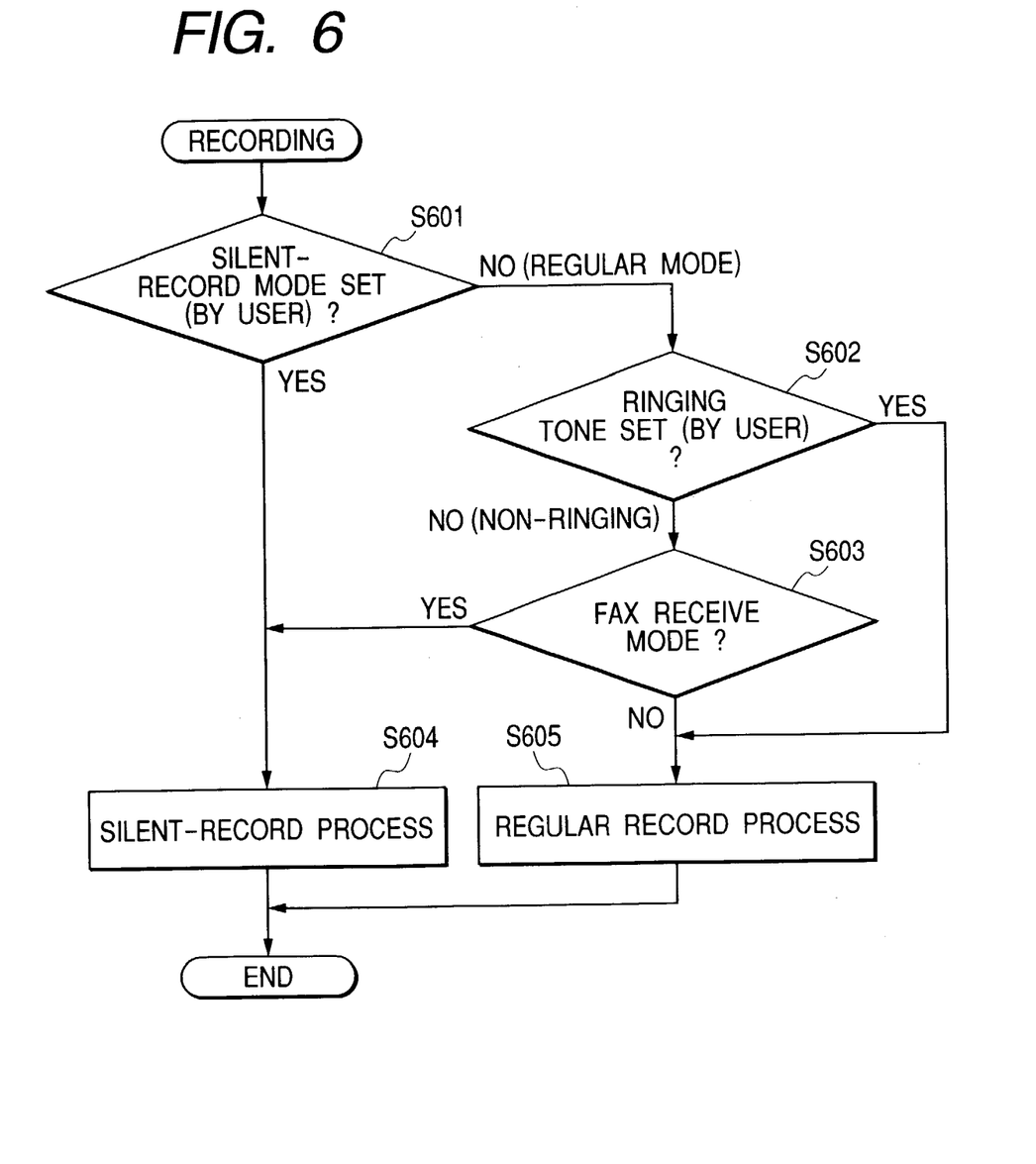
FIG. 6 is a flowchart showing operation of a facsimile apparatus FS5 according to a fifth embodiment of the invention.

FIG. 6 is a flowchart showing recording in the facsimile apparatus FS5 according to the fifth embodiment of the invention.

First, it is determined whether the record mode (stored in the RAM 103) which can be set by a user is a regular record mode or a silent-record mode (S601). When the record mode is the silent-record mode, a silent-record process is performed (S604). When the record mode is a regular record mode, it is determined whether a ringing tone set (stored in the RAM 103) which can be set by a user is in a ringing state or in a non-ringing state (S602). When the ringing tone set is in the ringing state, a regular record process is performed (S605). On the other hand, when the ringing tone set is in the non-ringing state, it is determined whether or not the operation mode is for recording at a time of fax receiving (S603). When the operation mode is for recording at the time of fax receiving, a silent-record process is performed (S604). When the operation mode is for recording at a time other than the time of fax receiving (at a time of copying, at time of fax memory receiving and recording and at a similar time), a regular record process is performed (S605).

As described above, in the fifth embodiment of the invention, in case that the record mode has been set to the silent mode or the ringing tone set is the non-ringing state even when the record mode has been set to the regular mode, and in case that the operation mode is for recording at the time of fax receiving, recording is performed more silently than the case of regular recording, thereby improving the noise-reducing effect. In the other cases, recording is performed regularly, thereby preventing recording speed from lowering.

According to the present invention, such an advantage or effect can be achieved that, when the ringing tone has been set to the non-ringing mode or when the operation mode at a start time of recording is for fax receiving, the noise-reducing effect can be improved. In addition, a recording speed can be prevented from lowering at a time when the ringing tone has been set to a ringing state, at a time of copying or at a similar time.

What is claimed is:

1. An image communication apparatus provided with receiving means for receiving image data from a partner communication apparatus through a communication line and recording means for recording image data received by the receiving means on a record medium, comprising:
    silent-record means for performing recording more silently than regularly;
    operation determining means for determining whether an operation mode at a start time of recording is for recording at a fax receive time or for recording at the other time; and
    control means for, when the operation mode at the start time of recording is for recording at the fax receive time, operating the silent-record means to perform recording more silently than regularly, while when the operation mode at the start time of recording is for recording at the other time, performing regular recording.

2. An image communication apparatus provided with receiving means for receiving image data from a partner communication apparatus through a communication line and recording means for recording image data received by the receiving means on a record medium, comprising:
    silent-record means for performing recording more silently than regularly;

ringing tone setting means for setting a ringing state about ringing/non-ringing performed when a ringing signal has been received from a partner communication apparatus through the communication line; and control means for, when a state in which a ringing tone is not rung is set by the ringing tone ringing setting means, operating the silent-record means to perform recording more silently than regularly.

3. An image communication apparatus according to claim 2, further comprising operation determining means for determining whether the operation mode at the start time of recording is for recording at the time of fax receiving or for recording at the other time, wherein the control means is means for operating the silent-record means to perform recording more silently than regularly when the state in which a ringing tone is not rung has been set by the ringing tone ringing setting means and when the operation mode at the start time of recording is for recording at the time of fax receiving, while performing a regular recording in case of recording at a time other than the time of fax receiving even when a state in which is ringing tone is not rung has been set by the ringing tone setting means.

4. An image communication apparatus according to claim 2, further comprising record mode setting means for allowing an operator to set either one of a record mode in which recording is performed by the silent-record means and another record mode in which regular recording is performed, wherein the control means is means for operating the silent-record means to perform recording more silently than regularly even when recording has been set to a regular record mode by the record mode setting means or even when a ringing state of a set ringing tone has been set to a state in which a ringing tone is not rung by the ringing tone setting means.

5. An image communication apparatus according to claim 4, further comprising recording operation determination means for, at a start time of recording, determining whether the operation mode is for recording at a time of fax receiving or for recording at the other time, wherein the control means is means for operating the silent-record means to perform recording more silently than regularly in case that a state in which a ringing tone is not rung has been set by the ringing tone setting means and in case that the operation mode at the start time of recording is for recording at a time of fax receiving even when the recording has been set to the regular record mode by the record mode setting means, while performing a regular recording at the other time.

* * * * *

UNITED STATES PATENT AND TRADEMARK OFFICE
CERTIFICATE OF CORRECTION

PATENT NO. : 7,180,639 B2
APPLICATION NO. : 10/386688
DATED : February 20, 2007
INVENTOR(S) : Makoto Satake It is certified that error appears in the above-identified patent and that said Letters Patent is hereby corrected as shown below:

COLUMN 1:

Line 41, "or recording" should read --of recording--;
Line 46, "case that" should read --a case wherein--;
Line 50, "case that" should read --a case wherein--; and
Line 51, "case that" should read --a case wherein--.

COLUMN 2:

Line 47, "plate." should read --plate."--; and
Line 62, "a scheduling," should read --scheduling,--.

COLUMN 4:

Line 30, "UBS" should read --USB--;
Line 46, "case" should read --a case--;
Line 49, "case" should read --a case--; and
Line 51, "case" should read --a case--.

COLUMN 5:

Line 3, "case" should read --a case--;
Line 5, "case" should read --a case--;
Line 7, "case" should read --a case--;
Line 31, "case" should read --a case--;
Line 35, "other that" should read --other than--;
Line 58, "case" should read --a case--; and
Line 59, "case" should read --a case--.

COLUMN 6:

Line 21, "at time" should read --at a time--;
Line 25, "case" should read --a case--;
Line 26, "set is" should read --set is in--; and
Line 28, "case" should read --a case--.

COLUMN 7:

Line 19, "case" should read --a case--; and
Line 21, "is ringing" should read --ringing--.

UNITED STATES PATENT AND TRADEMARK OFFICE
CERTIFICATE OF CORRECTION

PATENT NO. : 7,180,639 B2
APPLICATION NO. : 10/386688
DATED : February 20, 2007
INVENTOR(S) : Makoto Satake It is certified that error appears in the above-identified patent and that said Letters Patent is hereby corrected as shown below:

COLUMN 8:

Line 16, "case that" should read --a case wherein--; and
Line 18, "case that" should read --a case wherein--.

Signed and Sealed this

Twenty-seventh Day of November, 2007

JON W. DUDAS
*Director of the United States Patent and Trademark Office*